US012300068B2

(12) United States Patent
McHugh et al.

(10) Patent No.: US 12,300,068 B2
(45) **Date of Patent: *May 13, 2025**

(54) METHOD AND SYSTEM FOR FACILITATING MONETARY VALUE GAMING TICKET REDEMPTION

(71) Applicant: Everi Payments Inc., Austin, TX (US)

(72) Inventors: Jim McHugh, Austin, TX (US); William Ramsour, Austin, TX (US); Travis Bussey, Austin, TX (US); Timothy Richards, Las Vegas, NV (US); Michael Aughney, Las Vegas, NV (US); Adam Fong, Henderson, NV (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,293

(22) Filed: Aug. 17, 2023

(65) Prior Publication Data

US 2023/0394921 A1 Dec. 7, 2023

Related U.S. Application Data

(63) Continuation of application No. 17/578,269, filed on Jan. 18, 2022, now Pat. No. 11,741,787, which is a continuation-in-part of application No. 17/237,994, filed on Apr. 22, 2021, now Pat. No. 11,587,400, which is a continuation-in-part of application No. 16/130,568, filed on Sep. 13, 2018, now Pat. No. 10,991,205, which is a continuation-in-part of application No. 15/272,395, filed on Sep. 21, 2016, now Pat. No. 10,078,940.

(51) Int. Cl.
*G07F 17/32* (2006.01)
*G06Q 50/34* (2012.01)
*G07F 17/34* (2006.01)

(52) U.S. Cl.
CPC ......... *G07F 17/3258* (2013.01); *G06Q 50/34* (2013.01); *G07F 17/3248* (2013.01); *G07F 17/3255* (2013.01); *G07F 17/3262* (2013.01); *G07F 17/34* (2013.01); *G07F 17/3251* (2013.01)

(58) Field of Classification Search
None
See application file for complete search history.

(56) References Cited

U.S. PATENT DOCUMENTS

| | | | |
|---|---|---|---|
| 6,296,569 | B1 | 10/2001 | Congello, Jr. |
| 6,500,067 | B1 | 12/2002 | Luciano et al. |
| 7,479,060 | B2 | 1/2009 | Walker et al. |
| 7,494,417 | B2 | 2/2009 | Walker et al. |

(Continued)

*Primary Examiner* — Damon J Pierce
(74) *Attorney, Agent, or Firm* — Snell & Wilmer LLP

(57) ABSTRACT

In accordance with a method and system for facilitating redemption of monetary value gaming tickets, such as issued by a gaming device upon cash-out, a ticket is presented, such as to a redemption kiosk. If the ticket is validated and has a monetary value which includes a fractional currency value, then the player is presented with an opportunity to play one or more games, such as slot games or entry games based upon a wager comprising at least the fractional currency value of the ticket, wherein winnings may be paid in a whole value as part of the ticket redemption or as separate prizes, whereby dispensing of fractional value, such as coins, may be avoided.

18 Claims, 6 Drawing Sheets

(56) References Cited

U.S. PATENT DOCUMENTS

| | | | |
|---|---|---|---|
| 7,547,251 | B2 | 6/2009 | Walker et al. |
| 7,587,334 | B2 | 9/2009 | Walker et al. |
| 7,606,729 | B1 | 10/2009 | Walker et al. |
| 7,780,522 | B2 | 8/2010 | Lutnick et al. |
| 9,401,070 | B1 | 7/2016 | Young et al. |
| 10,078,940 | B2 | 9/2018 | McHugh et al. |
| 11,587,400 | B2 | 2/2023 | McHugh et al. |
| 2002/0045476 | A1 | 4/2002 | Poole et al. |
| 2003/0207708 | A1 | 11/2003 | Sadri et al. |
| 2006/0246994 | A1 | 11/2006 | Walker et al. |
| 2008/0058086 | A1 | 3/2008 | Saffari et al. |
| 2008/0207296 | A1 | 8/2008 | Lutnick et al. |
| 2010/0120520 | A1 | 5/2010 | Roemer et al. |
| 2015/0045112 | A1 | 2/2015 | Donavan et al. |

METHOD AND SYSTEM FOR FACILITATING MONETARY VALUE GAMING TICKET REDEMPTION

RELATED APPLICATION DATA

The present application is a continuation of U.S. application Ser. No. 17/578,269, filed Jan. 18, 2022, which is a continuation-in-part of U.S. application Ser. No. 17/237,994, filed Apr. 22, 2021, now U.S. Pat. No. 11,587,400, which is a continuation of U.S. application Ser. No. 16/130,568, filed Sep. 13, 2018, now U.S. Pat. No. 10,991,205, which is a continuation-in-part of U.S. application Ser. No. 15/272,395, filed Sep. 21, 2016, now U.S. Pat. No. 10,078,940, which prior applications are incorporated by reference herein in their entirety.

FIELD OF THE INVENTION

The present invention relates to gaming systems which utilize tickets or vouchers which represent monetary value.

BACKGROUND OF THE INVENTION

Historically, wagering gaming machines such as rotating reel slot machines were configured to accept coins and/or currency as a wager and were configured to dispense coins and/or currency as winnings. However, most gaming systems are now "cashless", in that the gaming machines are configured to dispense tickets or vouchers which represent monetary value, instead of coins and/or currency.

For example, when a player desires to cash out funds belonging to them that are associated with the gaming machine (such as funds which the player provided to the gaming machine, less amounts wagered, plus amounts won), the gaming machine issues a ticket or voucher. The ticket or voucher represents the monetary cash-out value. The player can redeem the ticket at a central cashier station (which may be automated) or at a cashier's cage or window (typically manned by a live cashier). When the voucher or ticket is redeemed, its value is confirmed and then currency and/or coins in the amount of the voucher are dispensed to the player.

Such a "cashless" system is described in U.S. Pat. No. 6,048,269. One advantage to these systems is that the gaming machines no longer need to be equipped with bill and coin storage and dispensing devices, simplifying the machines and their cost. Another advantage is that casinos no longer need to continuously service the machines to keep them full of currency and coins so that they can pay out winnings. For example, in the past, casinos had to constantly run change carts around the casino floor to keep the gaming machines filled with coins and/or currency to ensure that the gaming machines could pay out winnings.

However, there are other problems are associated with cashless gaming systems. One problem is that in order to convert their ticket to money, players must still redeem their tickets for actual monies. This requires players to travel to a cashier station or cashier cage. Players often find this extra step (as compared to getting paid directly by the gaming machine in currency and/or coins) cumbersome and, particularly relative to tickets that have a small value, some players may not even redeem them. These tickets are referred to as "orphaned" tickets by the casinos. At any time, a casino may have thousands of orphaned tickets in their accounting system. These orphaned tickets create a problem for the casino because they must still be tracked and stored and represent an outstanding liability to the casino because they might be redeemed at a point far into the future.

In addition, players may seek to redeem thousands of tickets per day. Thus, a casino must still stock the cashier stations and cashier cages with large amounts of currency and coins. For example, a casino may need to replenish the coins in an automated cashier station many times per day. Despite the fact that cashless gaming systems have been in operation for nearly 20 years, no solution has been found to this problem.

A method and system which addresses these and other problems associated with cashless gaming systems, and particularly the redemption of cashless gaming vouchers, is desired.

SUMMARY OF THE INVENTION

Aspects of the invention comprise methods and systems for facilitating the redemption of monetary value gaming tickets or vouchers.

In one embodiment, a player presents one or more monetary value tickets or vouchers to a kiosk for redemption. The ticket is then validated as being redeemable. When a monetary value of the ticket comprises a monetary amount having a fractional currency value, the player is presented with an option to play a wagering game based upon a wager of the fractional currency value. When the player elects to play the wagering game, such as by providing input to the kiosk, a wagering game is presented.

Importantly, when an outcome of the wagering game is losing, the redemption proceeds by paying a first whole currency value comprising the monetary value less the wager, by dispensing from the kiosk currency in the amount of the first whole currency value. On the other hand, when an outcome of the wagering game is winning, the redemption process proceeds by paying a second whole currency value which is greater than the monetary value by dispensing from the kiosk currency in the amount of the second whole currency value. In a preferred embodiment, the second whole currency value comprises the monetary value, less the wager, plus a winning award.

In one embodiment, the fractional currency value comprises a number of cents of a dollar, wherein the wager thus comprises the cents portion of the monetary value or a number of dollars and the cents.

In another embodiment, a system comprises one or more gaming devices which are configured to present games or at which games are presented, such as gaming machines and gaming tables, and which are configured to dispense or issue monetary value tickets or vouchers, such as upon a cash-out. The system also comprises a casino accounting system, such as an accounting server which is configured to store information regarding monetary value tickets, such as a ticket identifier and associated monetary value, and to validate the tickets. The system also comprises one or more redemption kiosks. The kiosks preferably comprise at least one ticket reader or reading device, at least one video display, at least one user input device and at least one currency dispensing device. The kiosk is configured to read a presented ticket, to transmit information to the casino accounting system or server for validation and, if the ticket is validate and has a monetary value which has a fractional currency value, present an option to play a wagering game. When the player elects to play the wagering game, the kiosk presents the wagering game, such as by displaying wagering game information on the display thereof.

Again, when an outcome of the wagering game is losing, the redemption proceeds by paying a first whole currency value comprising the monetary value less the wager, by dispensing from the kiosk currency in the amount of the first whole currency value. On the other hand, when an outcome of the wagering game is winning, the redemption process proceed by paying a second whole currency value which is greater than the monetary value by dispensing from the kiosk currency in the amount of the second whole currency value. In a preferred embodiment, the second whole currency value comprises the monetary value, less the wager, plus a winning award.

In another embodiment of the invention, when the player wins the wagering game they are still issued a whole currency value in the amount of their ticket less the wager (just like if they had lost the wagering game), and separately or in addition they are issued an award or winnings, such as a separate ticket which represents winnings such as points, prizes or the like.

In another embodiment, a method of facilitating coinless redemption of a monetary value gaming system ticket comprises the steps of receiving, into a reader device at redemption kiosk, a physical monetary value ticket to be redeemed, the monetary-value ticket issued from a gaming machine and having associated monetary value, validating the ticket as being redeemable, and determining a monetary value of the monetary value ticket. When the monetary value comprises a monetary amount having a fractional currency value, a user of the kiosk is presented with an option to enter a gaming event based upon the fractional currency value. Upon accepting input from the user to enter the gaming event via an input device of the kiosk, the ticket is redeemed for a first whole currency value comprising the monetary value less the fractional currency value by dispensing from the kiosk currency in the amount of the first whole currency value. The factional currency value is converted to one or more plays of the gaming event, such as spins of a wheel or slot game or unique entries for an entry selection event, and a request for the one or more plays is transmitted to a gaming event server. The gaming event server may identify outcomes for the one or more plays and any associated winnings for winning outcomes, which are awarded to the user.

In one embodiment, the disclosed method may further comprise the steps of accepting input from the user of identification associated with an existing loyalty account. In addition, the factional currency value may be converted to one or more plays of the gaming event based on information associated with the existing loyalty account.

It is contemplated that a user may also request association with a new loyalty account. In such cases, a loyalty account identification device may be dispensed. The loyalty account identification device may be one or more of the following: a card, a barcode, an account number, and a QR code.

The prizes may comprise one or more of the following: cash award, goods, services, free wagering game play, and entry into another gaming events comprising prizes of higher values. In one embodiment, the cash award may comprise a portion of the total amount of entry fees collected from the event. In addition, the gaming event may comprise one or more of the following: a regularly occurring event, and a special event.

Also disclosed is a cashless gaming system configured to facilitate coinless monetary value ticket redemption. The system may comprise at least one gaming device which presents one or more wagering games and dispenses physical monetary value tickets and at least one casino accounting server which is in communication with the at least one gaming device at one or more times, the at least one casino accounting server configured to store information regarding the monetary value ticket, including a ticket identifier and a monetary value of the ticket. The system may also comprise at least one redemption kiosk having at least one ticket reader, at least one display device, at least one user input device, at least one currency dispensing device, at least one processor, at least one memory, and machine readable code stored in the memory and executable by the processor. The kiosk may be configured to transmit information regarding a ticket presented to the at least one ticket reader to the at least one casino accounting server for validation. When the ticket is validated by the at least one casino accounting server and a monetary value of the ticket has a fractional monetary value of currency, present an option to purchase one or more plays of a gaming event based upon the fractional currency value. The kiosk may accept input from a user of the kiosk to purchase the one or more plays via an input device of the kiosk via the at least one user input device. The ticket may be redeemed for a first whole currency value comprising the monetary value less the fractional currency value by dispensing from the kiosk currency in the amount of the first whole currency value. The factional currency value may be converted to the one or more plays of the gaming event. A request for the one or more plays may be transmitted to a gaming event server. The gaming event server may be configured to identify outcomes of the plays and award winnings for winning outcomes.

In one embodiment, the system may further comprise a player tracking system, and the processor may be further configured to cause the kiosk to accept input from the user of identification associated with an existing player tracking account in the player tracking system. In addition, the number of plays available for purchase to the user may depend on the factional currency value and information associated with the existing player tracking account.

Further objects, features, and advantages of the present invention over the prior art will become apparent from the detailed description of the drawings which follows, when considered with the attached figures.

DETAILED DESCRIPTION OF THE INVENTION

Figure 1:
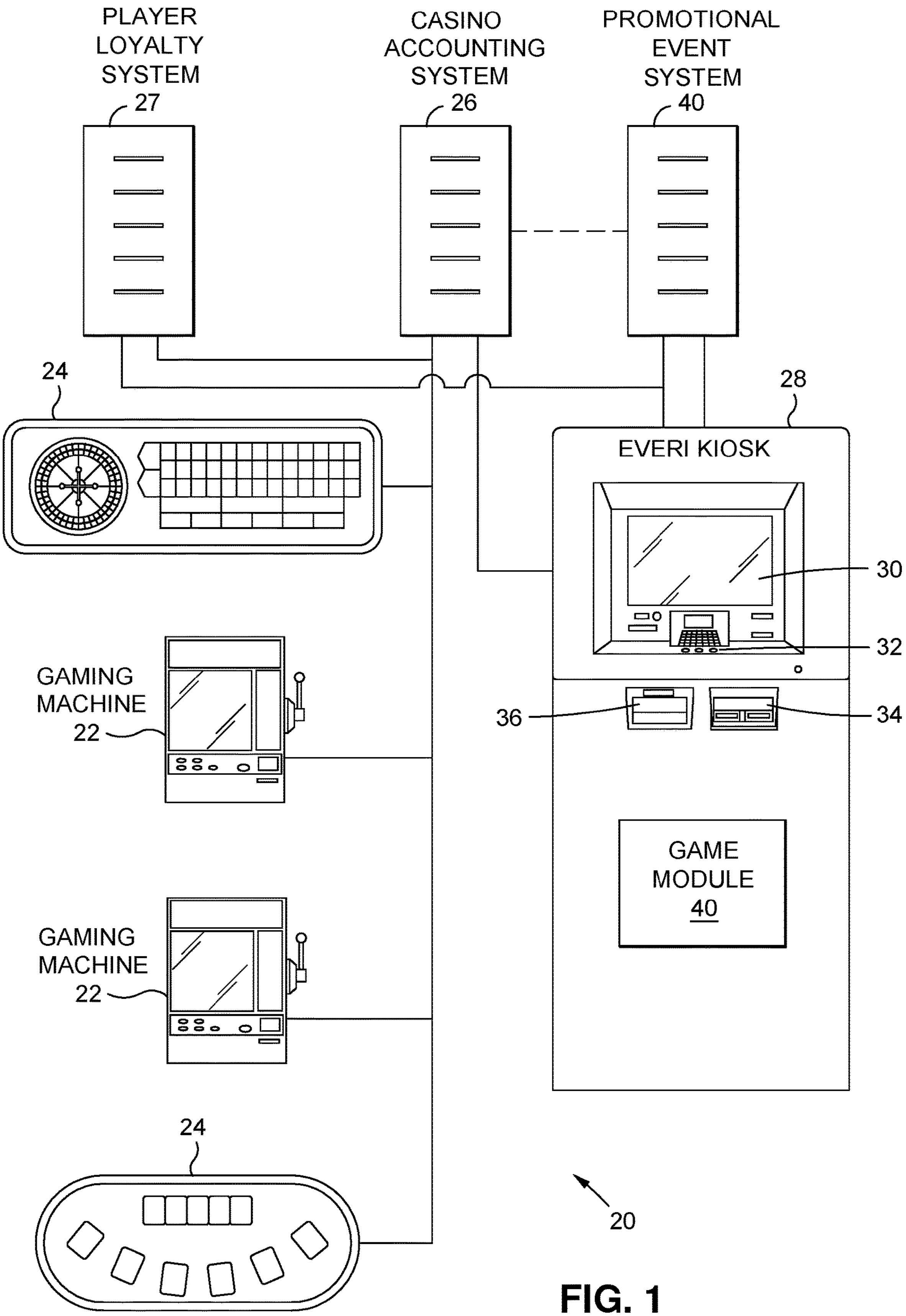
FIG. 1 illustrates on embodiment of a system of the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a system and method for facilitating the redemption of monetary value tickets or vouchers issued by a cashless gaming system.

One embodiment of a system 20 of the invention will be described with reference to FIG. 1. As illustrated, the system 20 may include one or more gaming devices, such as one or more gaming machines 22 and/or gaming tables 24. The system 20 may also comprise or include a casino accounting system 26 and one or more kiosks 28, as described in more detail below. The system 20 preferably implements a cashless gaming features, namely that some or all of the gaming devices are configured to issue monetary value tickets which may be redeemed for monetary value, rather than directly dispensing coins or currency.

Figure 2:
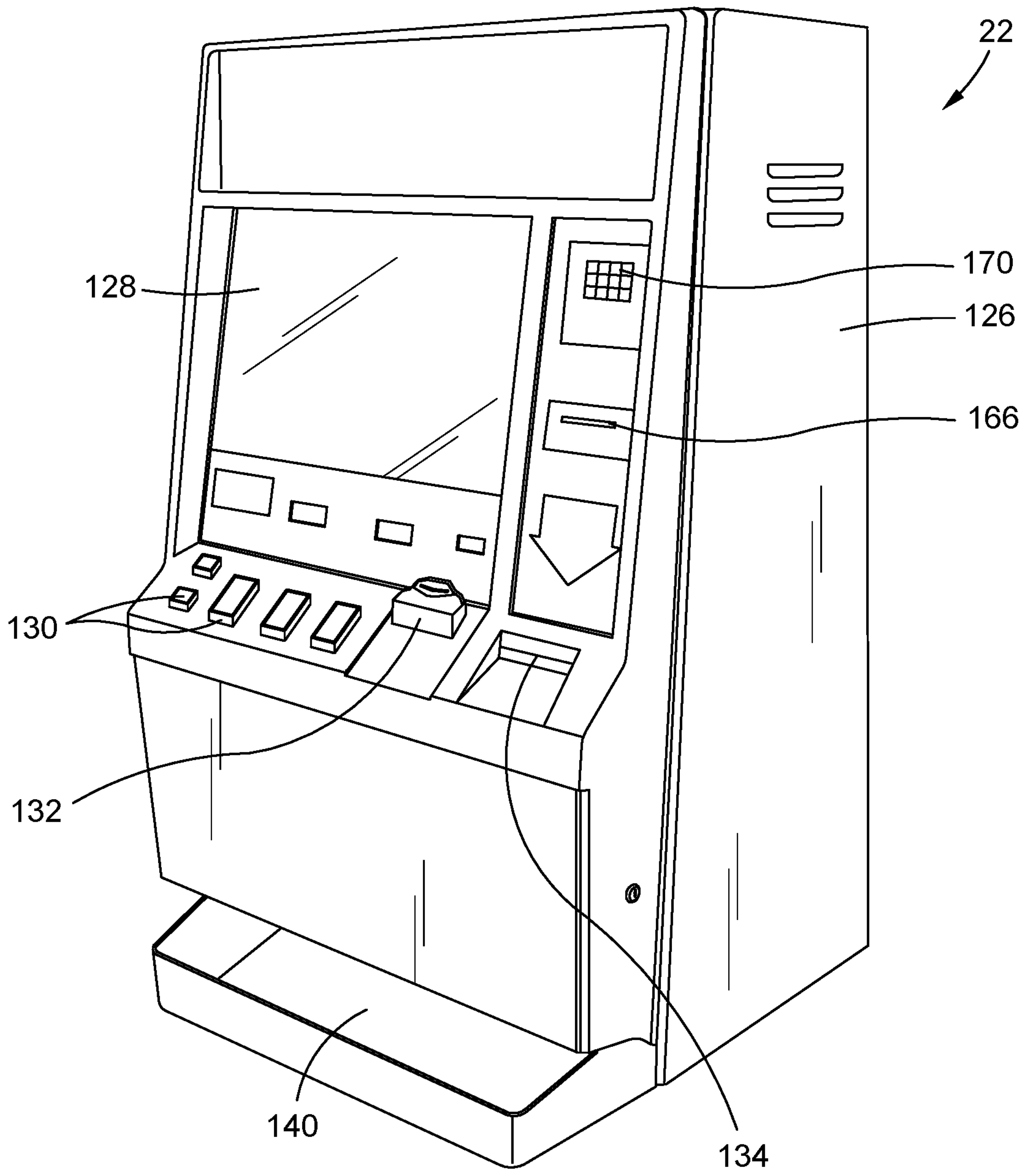
FIG. 2 illustrates one embodiment of a gaming machine of the system illustrated in FIG. 1.

One configuration of a gaming machine 22 is illustrated in FIG. 2. The gaming machine may be located at a casino (and as such may be referred to as a "casino gaming machine"). As illustrated, the gaming machine 22 generally comprises a housing or cabinet 126 for supporting and/or enclosing various components required for operation of the gaming machine. In the embodiment illustrated, the housing 126 includes a door located at a front thereof, the door capable of being moved between an open position which allows access to the interior, and a closed position in which access to the interior is generally prevented. The configuration of the gaming machine 22 may vary. In the embodiment illustrated, the gaming machine 22 has an "upright" configuration. However, the gaming machine 22 could have other configurations, shapes or dimensions (such as being of a "slant"-type, "bar-top" or other configuration as is well known to those of skill in the art).

The gaming machine 22 preferably includes at least one display device 128 configured to display game information. The display device 128 may comprise an electronic video display such as a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED) or other suitable displays now known or later developed, in a variety of resolutions, sizes and formats (e.g. 4:3, widescreen or the like). The display 128 may be capable of projecting or displaying a wide variety of information, including images, symbols and other indicia or information associated with game play, game promotion or other events. The gaming machine 22 might include more than one display device 128, such as two or more displays 28 which are associated with the housing 126. The gaming machine 22 might also include a top box or other portion. Such a top box might include one or more display devices 128, such as in addition to one or more main displays which are associated with the housing 126. Also, the gaming machine 22 might include side displays (such as mounted to the exterior of the housing 126) and might include multiple displays of differing sizes.

While the display devices may comprise one or more video displays, in another embodiment, the gaming machine 22 may include one or more physical reels capable of displaying game information, such as slot symbols. In such a configuration, means are provided for rotating the physical reels. In one or more embodiments, the means may comprise a mechanical linkage associated with a spin arm, with movement of the spin arm (a "pull") by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. The principal of such an arrangement is described in U.S. Pat. No. 4,448,419 to Telnaes, which is incorporated herein by reference.

As described in more detail below, the gaming machine 22 is preferably configured to present one or more games upon a player making a monetary payment or wager. In this regard, as described in more detail below, the gaming machine 22 includes mechanism or means for accepting monetary value.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. As detailed below, the gaming machine 22 preferably includes a mechanism or means for returning unused monetary funds and/or dispensing winnings to a player.

The gaming machine 22 preferably includes one or more player input devices 30 (such as input buttons, plunger mechanisms, a touch-screen display, joystick, touch-pad or the like). These one or more devices 130 may be utilized by the player to facilitate game play, such as by providing input or instruction to the gaming machine 22. For example, such input devices 130 may be utilized by a player to place a wager, cause the gaming machine 22 to initiate a game, to indicate cards to be held or discarded (or other actions, depending upon the game), to "cash out" of the gaming machine, or to provide various other inputs.

In one preferred embodiment, the gaming machine 22 includes at least one microprocessor or controller for controlling the gaming machine, including receiving player input and sending output signals for controlling the various components or peripheral devices of the machine 22 (such as generating game information for display by the display 128). The controller may be arranged to receive information regarding funds provided by a player to the gaming machine, receive input such as a purchase/bet signal when a purchase/bet button is depressed, and receive other inputs from a player. The controller may be arranged to generate information regarding a game, such as generating game information for display by the at least one display 28 (such as information comprising cards, game symbols or the like), for determining winning or losing game outcomes and for displaying information regarding awards for winning game outcomes, among other things. Of course, the gaming machine 22 might be configured to present any number of games such as slot-type games, poker or other card games or other games now known or later developed.

The controller may be configured to execute machine readable code or "software" or otherwise process information, such as obtained from a remote server. Software or other instructions may be stored at a memory or data storage device, e.g. in a fixed or non-transitory configuration. The memory may also store other information, such as pay table information. The gaming machine 22 may also include one or more random number generators for generating random numbers, such as for use in selecting slot symbols, cards or other game symbols or the like and for presenting the game in a random fashion (e.g. whereby the game is presented in a manner in which the player cannot control the outcome) or pseudo-random fashion (e.g. such as where the game includes a skill component which can affect the outcome of the game).

Preferably, the controller is configured to execute machine readable code or instructions which are configured to implement the game. In this regard, the gaming machine is specially configured to present the game of the invention via specific software and/or hardware which causes the gaming machine to operate uniquely. For example, the controller of the gaming machine 22 may be configured to detect a wager, such as a signal from a player's depressing of the "bet one" button. Upon such an event and/or the player otherwise signaling the gaming machine to present the game, the controller may be configured to cause the at least one display 128 to display unique information, such as a unique graphical interface or unique game display, including game symbols or other game information. The controller may accept input from a player of game inputs, such as a request to spin reels or the like, via the one or more player input devices of the gaming machine 22. It will be appreciated that the machine readable code may be configured in various manners, such as by having various "modules" of software which are designed to implement specific features of the game play or game presentation.

The gaming machine 22 may be configured to generate and present games in a stand-alone manner or it may be in communication with one or more external devices at one or more times. For example, the gaming machine 22 may be configured as a server based device and obtain game code or game outcome information from a remote game server (in which event the gaming machine controller may receive game information from the server, such as game outcome information, and use that server-generated information to present the game at the gaming machine).

As indicated, the gaming machine 22 is configured to present one or more wagering games. The gaming machines 22 is preferably configured to accept value, such as in the form of coins, tokens, paper currency or other elements or devices representing value such as monetary funds value. Thus, as indicated above, the gaming machine 22 preferably includes a mechanism or means for accepting monetary value. For example, as illustrated in FIG. 2, the gaming machine 22 might include a coin acceptor 132 for accepting coins. Of course, associated coin reading/verifying devices and coin storage devices may be associated with the gaming machine 22 if it is configured to accept coins. Likewise, the gaming machine 22 might include a media reader 134. Such a reader may be configured to accept and read/verify paper currency and/or other media such as tickets. Of course, in such event the gaming machine 22 may further be configured with one or more paper currency or ticket storage devices, such as cash boxes, and other paper currency or media handling devices (including transport devices).

The gaming machine 22 might also be configured to read FOB s, magnetic stripe cards or other media having data associated therewith and via which value or funds may be associated with the gaming machine 22. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications, such as to enable the transfer of funds from the player to the gaming machine or system.

When the player associates funds with the gaming machine or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as "Bet 1 Credit", "Bet 5 Credits", "Bet Maximum Credits" or other options). In one embodiment, when the player's wager is received, the player's credit balance is reduced by the number of wagered credits. The player might then provide a separate input to begin the game. In other embodiment, the player might select a "play game" input, such as by pressing a "spin" button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 22 is configured to award winnings for one or more winning wagering game outcomes. Such winnings may be represented as credits, points or the like. In one embodiment, the player may "cash out" and thus remove previously associated funds and any awarded winnings or such may otherwise be paid to the player. These winnings may be associated with the player's credit balance, thus increasing the player's credit balance.

In one embodiment, the player may provide an input to the gaming machine 22 to indicate their desire to cash out, such as by selecting a "cash out" button or touch screen feature or providing other input. In response, a monetary value represented by the player's credit balance or the like is preferably paid, transferred or otherwise provided to the player. While the gaming machine 22 might be configured to dispense coins and/or currency, the gaming machine is preferably configured to dispense a media, such as a printed ticket or voucher, which ticket represents the value which was paid or cashed out of the machine. The aspects of gaming machine "ticketing" systems are well known. One such system is described in U.S. Pat. No. 6,048,269 to Burns, which is incorporated herein in its entirety by reference. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine.

The gaming machine 22 may also include a player tracking device, such as a card reader 66 and associated keypad 170. Such player tracking devices are well known and may permit the game operator to track play of players of the gaming machine. The tracked play may be utilized to offer player bonuses or awards.

It will be appreciated that the gaming machine illustrated in FIG. 2 is only exemplary of one embodiment of a gaming machine 22. For example, it is possible to for the gaming machine to have various other configurations, including different shapes and styles and having different components than as just described.

The system 20 of the invention might also comprise or include other types of gaming devices. For example, the system 20 might include one or more gaming table 24. The gaming tables 24 might define a game play surface and at which physical game pieces including dice, playing cards, wheels or the like might be used to present one or more games. The gaming tables 24 or other gaming devices might be automated or be configured to be operated by a dealer or the like. In one embodiment, a gaming device might comprise a betting station, such as a betting station which allows back-betting upon a game which is presented at a gaming table or upon a sports event or the like.

In one embodiment, the gaming tables 24 or other gaming devices may include media dispensing devices, such as voucher or ticket printers, like the gaming machine 22 described above. For example, an automated roulette table might be configured with betting stations. A player using one of those betting stations might desired to cash out. Upon cashing out, a media dispenser might be configured to dispense a monetary value voucher or the like to the player.

In one embodiment, the gaming devices, such as the gaming machines 22 and gaming tables 24 are associated with a casino accounting system 26. In one embodiment, such a system 26 may comprise, for example, one or more accounting servers, user stations, printers, databases and the like. The accounting server may include one or more processors, one or more memory devices, one or more communication interfaces and one or more peripheral devices. Machine readable code, such as fixed in the memory, may be execute by the one or more processors in order to implement various functionality. In one embodiment, the casino accounting system 26 is preferably configured to generate voucher or ticket information, store voucher or ticket information, track monetary value transactions, including cash-out amounts, validate vouchers or tickets and generate accounting-related reports.

As one example, when a player cashes out of a gaming machine 22, the gaming machine 22 may transmit a signal to the accounting system 26 regarding the cash-out and the monetary value of the cash-out. The accounting system 26 generates ticket information (such as a ticket code or identifier) and stores the generated ticket identifier and its associated value. In response, the gaming machine 22 prints or otherwise issues the ticket or voucher to the player.

Later, when the player wishes to redeem the ticket, the ticket identifier is read and transmitted to the accounting system 26 for validation. If validated, the amount of the ticket is paid to the player, preferably in the form of actual monies (e.g. directly in currency/coins). The accounting system 26 may include audit and report generation capabilities for reconciling monetary values associated with the machines and issued and redeemed tickets.

The gaming system might include other devices or systems, such as a player tracking system. Such a system may include at least one player tracking server. This server may store player information, including player accounts in association with identified players (such as using player IDs or the like). Such player accounts might store information regarding player game play activities and/or player rewards, such as player tracking points which the player can redeem for prizes, discounts or the like). In one embodiment, a player's game play may be tracked at a gaming machine 22 or gaming table 24, such as by associating their game play information (wagers made, winnings paid, etc.) with their identify (such as determined from a player tracking card used by the player or the player inputting identifying information).

Referring again to FIG. 1, in accordance with the present invention, the system 20 preferably includes one or more ticket redemption locations at which one or more tickets may be redeemed for monetary funds. In one embodiment, a redemption location may comprise a self-serve kiosk 28. The kiosk 28 may comprise a housing which houses or supports a user interface, a ticket or voucher reader, a ticket storage device or mechanism, one or more monetary storage devices or mechanisms and a monetary dispenser, along with various control mechanisms such as a processor, communication interface and the like.

The user interface might comprise, for example, at least one video display 30 and one or more input devices such as a touch-screen, keyboard 32 or buttons. The ticket reader 34 preferably comprises at least one device for reading information which is associated with a monetary value ticket or voucher, such as a bar code scanner or the like, and might define a slot into which the user inserts the ticket or voucher. The ticket storage element may comprise a ticket storage canister or the like. The monetary storage element might comprise currency and/or coin storage. The monetary dispenser 36 preferably comprises one or more currency and/or coin dispensers.

In one embodiment, the kiosk 28 includes a game module 40. The game module 40 may comprise machine readable code fixed in a tangible medium (such as stored in a memory device associated with the processor), e.g. software, which is executable by the processor. The module may be configured to generate user interfaces, such as for display on the electronic display 30 of the kiosk 26, receive inputs, and generate outputs.

As described in more detail below, in one embodiment, the kiosk 28 is configured to receive a ticket. A player may insert or otherwise provide one or more tickets to the kiosk 28, such as by inserting the ticket into the ticket reader 34. The ticket reader 34 reads the ticket(s) for validation (such as by reading information such as a voucher or ticket number which is printed on or otherwise associated with the ticket, such as a bar code, a magnetic stripe or the like). In one embodiment, the ticket may be validated by sending information to the accounting system 26, such as the voucher or ticket identifier. The accounting system 26 then compares that identifier to the records in its system to confirm that the ticket exists, that it has not yet been redeemed, and its value. If validated, the accounting system 24 may send a validation signal to the kiosk 28.

The game module 40 is preferably configured to present the player with the option of wagering part of the value of the presented ticket(s). In one embodiment, the game module 40 is configured to determine if the presented voucher or ticket has a fractional currency value, e.g. a value which is not a full currency value. Preferably, this value comprises a number of cents of a dollar, e.g. amounts between $0.01 and $0.99. If so, the game module 40 may, as described in more detail below, be configured to cause the kiosk 28 to display a graphical user interface or other information regarding the player's option to wager the fractional monetary value. If the user elects this option, the game module 40 is preferably configured to present one or more wagering games, such as by generating and displaying game information such as game symbols or the like and, if the outcome is winning, award winnings which may be dispensed by the kiosk 28.

As described in more detail below, the system 20 may include or be connected to/communicate with a promotional event system 40. In one embodiment, such a promotional system 40 may comprise, for example, one or more promotional event servers, user stations, printers, databases and the like. The promotional event server may include one or more processors, one or more memory devices, one or more communication interfaces and one or more peripheral devices. Machine readable code, such as fixed in the memory, may be execute by the one or more processors in order to implement various functionality. In one embodiment, the promotional event system 40 is preferably configured to receive event entries and generate event outcomes, such as to define one or more winning entries. In some cases, as detailed below, the event entries may comprise or be evidenced by event tickets, receipts or the like, while the entries may also comprise electronic records.

Winning event outcomes may be associated with or result in the award of one or more prizes. Prizes may include cash awards, prizes, or an entry to a promotional event involving prizes of higher values, free or reduced prize goods or services, free wagering game play, etc. In one embodiment, cash awards may include a portion of all entry fees collected by the system, or at least a portion of all entry fees for a particular event. In one embodiment, more than one casino might be associated with a promotional event system 40 and events presented thereby. Promotional events may be a regular occurring event, or a special event.

The promotional event system 40 may be in communication with the kiosk 28 directly or indirectly, such as via a network (such as the Internet), such that the kiosk 28 may be configured to transmit requests for registration of entries into the promotional event system 40. The promotional event system 40 may be configured to process such requests and transmit confirmation of processing to the kiosk 28. Upon identification of one or more winning entries, the promotional event system 40 may be configured to provide information associated with the one or more winning entries to the kiosk 28.

One or more promotional event systems 40 may also be in direct communication with, or comprise the casino accounting system 26 and/or other systems in the casino, particularly systems involved in player tracking and player rewards. Other promotional event systems 40 may be separate from the system 20, and may communicate with the system 20 through the kiosk 28. For example, the promotional event system 40 may be associated with a party not affiliated with a casino, such as a restaurant offering a drawing for a free meal, or a travel company offering a drawing for a free trip.

The promotional event system 40 may implement a player tracking or loyalty program or function, or as illustrated in FIG. 1, the promotional event system 40 might be linked to a separate player tracking or loyalty program system 27, such as operated by a casino.

One embodiment of a method of the invention will be described with reference to FIG. 3. The method of the invention may be implemented relative to a system 20 such as that described above and illustrated in FIG. 1. However, the method might be implemented in other manners.

In a step S1, a voucher or ticket having monetary value is received for redemption. The monetary value voucher or ticket may have been obtained by the presenter/player in various manners. For example, as indicated above, the ticket or voucher might be dispensed to a player upon cashing out of a gaming machine. The ticket or voucher might also have been issued or dispensed from other devices or locations, such as a kiosk, cashier's station or the like.

In the preferred embodiment, the ticket or voucher represents monetary value—e.g. it is not itself currency or coins, but is preferably redeemable for money. Preferably, the ticket or voucher is presented to a kiosk 28 for redemption. In the event the ticket or voucher comprises or is represented by a media, the ticket or voucher is presented and read at the kiosk 28, such as by inserting a printed ticket into a ticket reader of the kiosk, or when the ticket comprise other media such as a magnetic stripe card, into a card reader or other device. The reader might also comprise a bar code scanner or the like where the player holds up the ticket to the scanner. In other embodiments, the ticket or voucher need not comprise physical media, but might comprise an image of a bar code, such as displayed by the player's phone and read by an optical reader of the kiosk. When the voucher or ticket is received at the kiosk, it is read by the kiosk, meaning that information regarding the voucher or ticket is obtained by the kiosk.

In a step S2, the ticket or voucher is validated. Preferably, this comprises confirming that the voucher can be redeemed, e.g. is payable, and the amount of the voucher. In the case of the system 20 illustrated in FIG. 1, the kiosk 28 may transmit information to the casino accounting system 26 regarding the ticket or voucher, such as the ticket or voucher ID. The casino accounting system 26 may use this information to confirm the identity of the ticket or voucher, to confirm that it has not already been paid, and its value. As part of this process, the casino accounting system 26 preferably transmits a response back to the kiosk 28. The response might include a redemption denial, such as if the particular ticket or voucher was already redeemed, or might comprise a redemption approval. If the ticket or voucher is not validated, the process may end, as in a step S3 (or the player might be given the opportunity to present other/additional vouchers or the like).

If the voucher or ticket is validated, then in a step S4, it is determined whether the monetary value of the voucher includes a factional amount or value. Preferably, this comprises determining if the voucher has a monetary value which includes a fractional currency value, and most particularly, a fractional value of one dollar ($1.00)—e.g. a number of cents of a dollar ($0.01 to $0.99). Examples of vouchers having a monetary value which includes a fractional amount comprise the monetary values: $0.82, $4.56, $100.02, $500.50 and $1089.07.

If the monetary value of the ticket or voucher does not include a fractional currency amount, then in a step S5, the voucher or ticket is preferably redeemed by dispensing its monetary value. In one embodiment, this comprises dispensing currency (e.g. a number of physical monetary currency bills) from the kiosk 28, such as from a currency dispensing device thereof. For example, if the monetary value of the ticket is $120.00, the kiosk 28 might be configured to dispense six (6) $20.00 denomination bills to the player.

If the monetary value of the ticket or voucher does include a fractional value, then in a step S6, the player is preferably presented with the option to wager the fractional wager value. In one embodiment, as described above, the option might be presented via a graphical user interface which is displayed via the display 30 of the kiosk 28. Of course, various information might be displayed to the player. As one example, the option might comprise the display of the following offer: "Your ticket has a value of $60.78. Would you like to wagers the $0.78 portion on the Spin the Wheel Game for a chance for an award? Yes or No." The player might then touch the display 30 in the vicinity of the "Yes" or "No" option to make their selection.

In a step S7, it is determine whether the player has elected to place the wager. If not, then in a step S8, the voucher or ticket is preferably redeemed by dispensing its monetary value. In one embodiment, this comprises dispensing currency and/or coins from the kiosk 28, such as from the currency and/or coin dispensing mechanisms. For example, if the value of the ticket is $20.25, the kiosk 28 might be configured to dispense one (1) $20.00 denomination bill and one (1) quarter.

If in step S7 the player elects to place the wager, then one or more game events are presented to the player. In one preferred embodiment of the invention, the game event is a wagering event where the player places a wager in the amount of the fractional monetary value of their gaming ticket. Preferably, the wagering event offers the player a chance for an award which would cause the monetary value of their ticket or voucher to end up as a whole monetary value. As one example, a player's voucher might have a value of $20.25. The player might wager the $0.25 value of their ticket (thus leaving them with $20.00) for a chance to win $20.00 so that the total amount due the player, if they won the gaming event, would be $40.00 (or some other whole value monetary amount).

Of course, the player might also be permitted to wager some amount which includes the fractional value (whereby the remaining amount due to the player after the wager is a monetary value which does not include a fractional currency value). For example, if the players ticket or voucher as a value of $22.68, the player might be permitted to wager $0.68, $2.68, $12.68 or the like.

Various wagering events could be presented to the player. For example, slot-type games, wheel spins, video poker games or any variety of other games now know or later developed might be presented. In one embodiment, one or more of the outcomes of the gaming event, but not all of them, are preferably winning outcomes (and the remainder may thus be losing). In the case of a losing outcome, the player loses their wager. In the case of a winning outcome, the player may be awarded an award. As indicate above, the award preferably has a value which causes the final amount due to the player to be a monetary value which does not include a fractional currency value).

As one example, a first player might seek to redeem a ticket having a value of $100.04. The player might be presented with the option of wagering the fractional currency value of $0.04 (4 cents) by spinning a wheel having eight (8) segments. Four (4) of the segments might be blank (and thus losing), and the other segments might display the values $1.00, $2.00, $3.00 and $10.00. If the player wagered the $0.04, their remaining balance due would be $100.00. However, if the wheel spin resulted in the selection of the $3.00 segment, the player would then be entitled to a total payout of $103.00 (the remaining redemption value of the ticket of $100.00 plus winnings of $3.00).

As another example, a second player might seek to redeem a ticket having a value of $50.88. The player might be presented with the option of wagering their $0.88 by spinning a wheel having 6 segments. Two (2) of the segments might be blank (and thus losing) and the other segments might display the values of $1.00, $4.00 and $10.00. In other words, in recognition of the fact that the second player is wagering more (as compared to the first player's wager in the above example), the odds of winning and/or the awards might differ (such as by being higher).

Of course these are just examples and various other configurations of games having various odds of winning and/or payouts might be utilized. As yet another example, a video poker game might be presented to the player where certain hands are designated as winning and have a payout. For example, in one video poker game a player might only win if they achieve a designated hand, such as a Four of a Kind.

In one embodiment, the game may be generated and/or implemented by the game module at the kiosk 28. In other embodiments, if the player elects to play the game, the kiosk 28 might send a signal to a remote game server which generates game data, such as game results, and then causes the kiosk 28 to display the game information and/or results to the player. Preferably, the game is presented in an entertaining form to the player.

In a step S10, it is determined whether the outcome of the wagering event was winning or losing. If the outcome was losing, then in a step S11, the monetary value of the ticket or voucher, less the player's wager, is preferably paid to the player. Advantageously, because the player wagered the fractional monetary value of their ticket, the remaining amount owing to the player would not include any factional value. Thus, in the preferred embodiment, the player could be paid in whole currency values. This may be accomplished, for example, by dispensing currency from the kiosk 28 to the player.

In a step S10, if the outcome is winning, then in a step S12, the player is paid the value of their ticket or voucher, less their wager, plus winnings. As indicted above, the award value is selected so that, after the player's wager of their fractional monetary value, the amount owing to the player would again be a whole monetary amount, thus allowing the player to be paid in whole currency values. This may be accomplished, for example, by dispensing currency from the kiosk 28 to the player.

In another embodiment of the invention, if the outcome is winning, the player may be paid the value of their ticket or voucher, less their wager (e.g. the same amount as if they had lost), but in addition, the player is preferably separately awarded winnings or an award. For example, the player might elect to play the wagering event and they might win that event in step S10. However, in step S12, the player might still be paid the value of their ticket or voucher, less their wager. This value would preferably be, as noted above, a whole currency value. In addition, the player might be awarded an award. The award might be monetary value, points, credits or even goods or services. Such an award might be associated with the player's player tracking account (such as if the player used their player card as part of redeeming their ticket or voucher), such as by associating winnings in the form of player tracking or rewards points with their account. Such an award might also be provided to the player in the form of an award ticket or voucher which is printed at the kiosk 28 and presented to the player. That ticket might, for example, be bar coded or otherwise contain or include information regarding the award. The ticket or voucher might be redeemable at a gaming machine (such as if the award comprised credits that could be used at such a machine to play a game), or at a cashier station (such as if the award is monetary value that can be paid in coins/currency), or a prize station or booth (such as if the award is one or more promotional goods or services; such might comprise goods such as a t-shirt or jacket, a buffet pass, a show ticket, a free massage or spa pass, etc.).

As one example of this embodiment, a player might seek to redeem a ticket having a value of $59.88. The player might be offered the opportunity to play a game for a wager of $9.88. The player might win that event. The player might then be issued currency in the remaining amount of $50.00. In addition, the player might be awarded an award, such as a ticket which might be redeemed for a prize or the like, or a ticket which might have $25.00 in game play credits which may be used at a gaming machine by inserting the ticket into the gaming machine.

Of course, in such a configuration, the kiosk 28 might communicate with the casino accounting system 26 to seek the generation of the award ticket, which ticket can then be validated by a cashier, gaming machine or the like upon the ticket being presented by the winner. As also indicated, in such a configuration, the kiosk 28 might communicate with one or more other casino systems (either directly or indirectly, such as via the casino accounting system 26), such as a casino player tracking/rewards system, such as for awarding rewards points to a player's account. As noted, in the case where the user is eligible for player rewards points, the kiosk may prompt the user for player information, such as the user's player identification number and PIN, either via manual entry or by insertion of a player tracking card or the like (whereupon the kiosk 28 and/or player tracking system/server may utilize that information to identify the user and their associated account, such as for associating won rewards points thereto for the user's later use).

In one embodiment, the wagered fractional value might comprise the fractional value which is above the nearest whole currency value (such as $0.58 in the case of a ticket having a value of $66.58) or the fractional value may include one or more whole currency values. For example, if a player seeks to redeem a ticket having a value of $35.60, the player might be presented with the opportunity to wager $0.60, $5.60, or $35.60 (e.g. amounts which at least include the fractional value and thus, when wagered, would leave a whole currency value, including a zero currency value).

As noted above, the wagering game might be presented at the kiosk, where game information is either generated by the kiosk or is generated by a remote server, such as a game server, for presentation at the kiosk. However, the outcome of the game need not be determined at the time the player redeems their ticket at the kiosk and/or wagering game information need not be displayed at the kiosk. In this case, the kiosk 28 need not include a game module 40 or at least a game module which is configured to generate game outcomes (as detailed below, the kiosk 28 might include a module which enables communication with a game server and which then enables presentation of game information, such as game outcome information, where the outcomes of the games are determined by the game server).

As one example, the wagering game might comprise one or more pull-tab games. These games have various forms, but essentially comprise a predetermined game result, such as represented by a printed or electronic ticket or tab. The player opens (such as virtually) the ticket or tab in order to view the result of the game, which may be winning or losing. In this configuration, a plurality of pull-tabs may be generated as a set, where certain pull-tabs are winning and others are losing and where the pull-tabs are randomly distributed.

As one example, a player might cash-in a ticket for $5.17 and the $0.17 fractional currency value might be used to purchase 17 pull-tabs (at a cost of $0.01). The kiosk 28 may communicate with the game server, such as a pull-tab server. The game server may assign 17 pull-tabs to the player. The pull-tabs, or at least the results thereof, may be displayed to the player at the kiosk 28. For example, a graphical representation may be displayed of each pull-tab and the act of opening the pull-tab and displaying the outcome thereof (in some variations, entertaining displays may be used to represent the outcome of the pull-tab, such as the display of a slot-game which has a winning or losing outcome which depends upon whether the associated pull-tab is winning or losing).

In one embodiment, the outcome of such a game or games may again be a whole currency value which then allows the kiosk to dispense currency for the remaining value of the ticket plus the winnings. In other embodiments, as described below, the pull-tabs (or the outcomes thereof, such as the winnings), might be associated with a player, such as their player tracking account or a wallet. In this manner, any winnings for the pull-tabs might be redeemed by the player at a cashier or other location, or placed directly into a wallet or other account of the player (e.g. the kiosk dispenses the ticket whole currency value less the fractional wager value directly to the player and any pull-tab winnings may be awarded to the player separately).

Of course, games other than pull-tabs might be utilized, such as keno-type games, lottery style games, bingo games, etc., such as where the player is assigned a keno game card, lottery ticket, bingo card, etc., and the outcome of the game is determined by a remote game server. In this manner, the kiosk 28 itself does not need to directly implement the game or itself comprise a gaming machine.

In one embodiment, the kiosk may enter a player into a game where the game outcome may be determined at a later time, such as by a remote game server. Here the player may be "entered" into a game, but the game results, including any award, need not be determined when then player redeems their monetary value ticket. In such an event, the player receives the whole value cash and one or more entries into or play of a game. The player may also be issued a game or event entry. In some embodiments, the game comprises a promotion or promotional event. Further, while the player may be issued a physical game ticket or receipt as representative of an entry into the game, the player might simply be issued an electronic confirmation or such a confirmation or game ticket/entry might be associated with an electronic account associated with the player. In other words, the player may utilize some of the value of their monetary value ticket, such as the fractional value, as an entry into a game—e.g. as a chance to obtain a winning game outcome.

Figure 3:
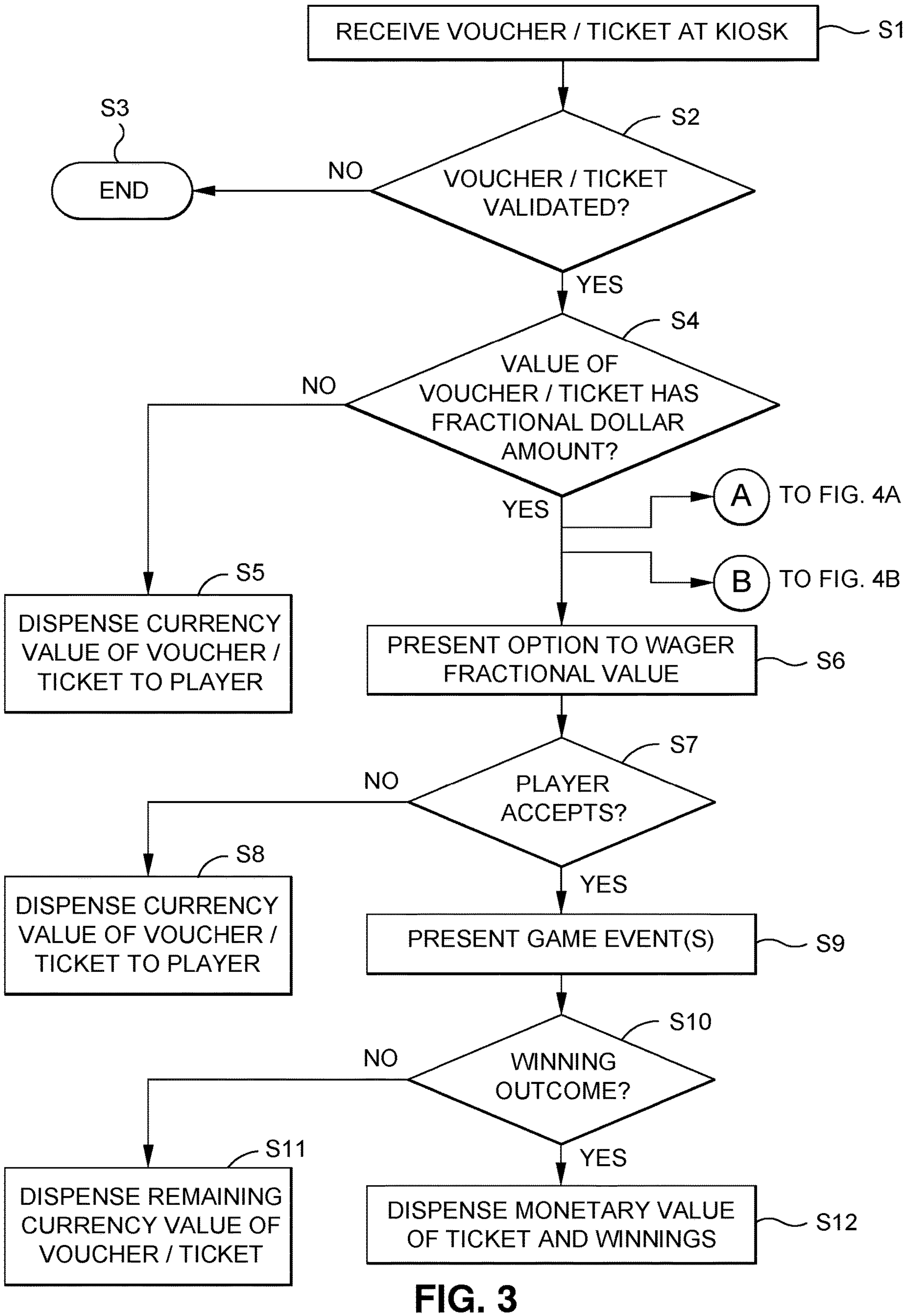
FIG. 3 is a flow diagram of one embodiment of a method of the invention.
Figure 4A:
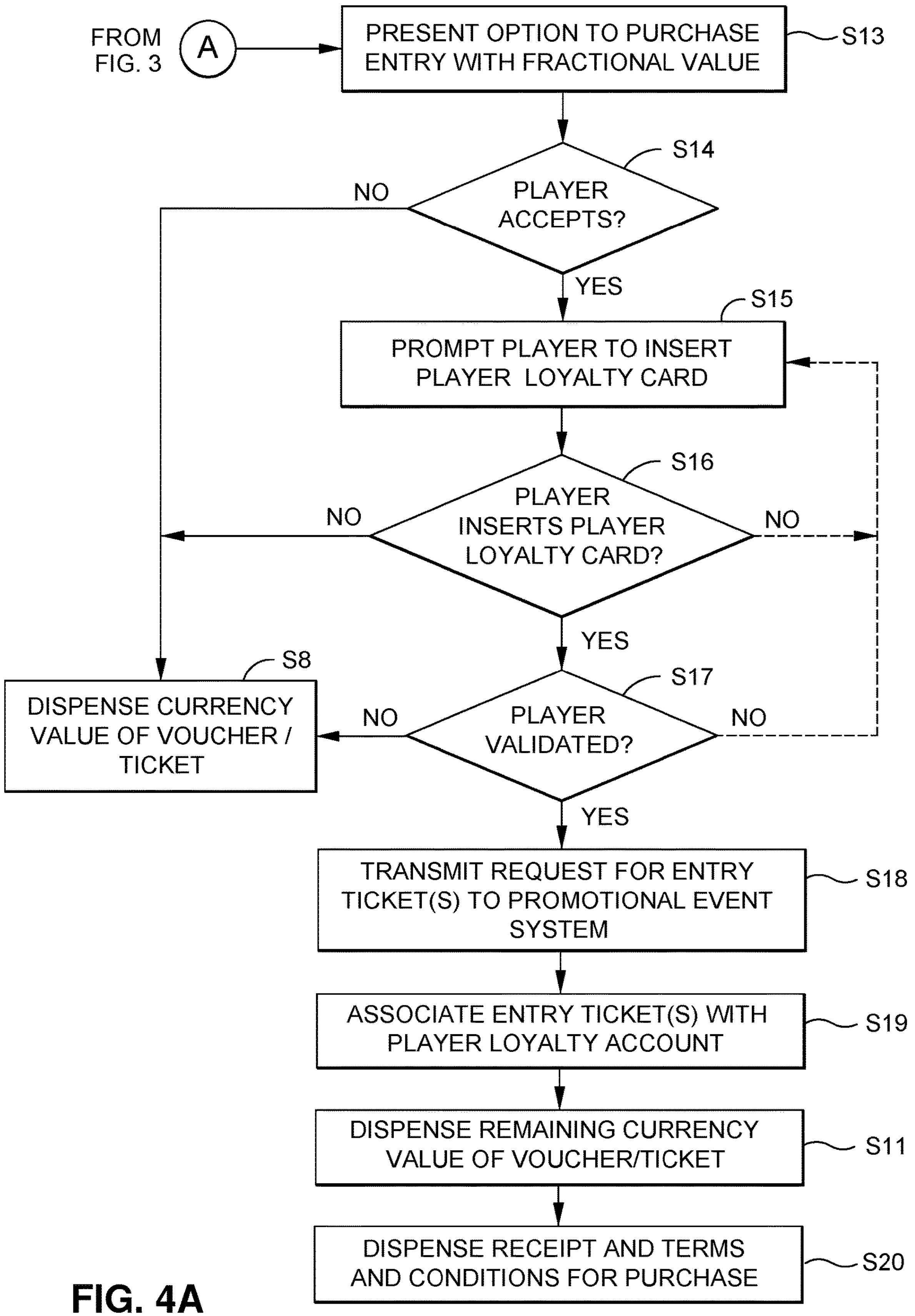
FIG. 4A illustrates a first exemplary flowchart of another embodiment of the invention.

FIG. 4A illustrates a first exemplary flowchart of another embodiment of the invention. In FIG. 4A, following step S4 illustrated in FIG. 3 and described above, the game presented to the player may be a game which has an outcome thereof determined remotely and/or at a later time, such as in the form of at least one entry into a game.

In this example, a player is only able to utilize their fractional currency value to participate in the game if they have an associated player tracking/loyalty account.

In one embodiment, as described above, the option might be presented via a graphical user interface which is displayed via the display 30 of the kiosk 28. Of course, various information might be displayed to the player. As one example, the option might comprise the display of the following offer: "Your ticket has a value of $60.78. Would you like to use the $0.78 portion to purchase 78 entries into the Hot August Promotional Event for a chance for an award? Yes or No." The player might then touch the display 30 in the vicinity of the "Yes" or "No" option to make their selection.

Entry prices are preferably in a smallest possible monetary unit, such that all fractional values may be converted to entries. For example, the $0.78 portion of a $60.78 redemption ticket may be used to purchase 78 entries. In other embodiments, the cost of entries might vary, such as depending upon the game or event (for example, some events might have entries that cost $0.01 and others that cost $0.25, where what entries the player can purchase depends upon the fractional value of their ticket). In other embodiments, the value or cost of the entries might depend on additional factors. For example, relative to an embodiment described below where game play is linked to a player promotional event system, players with different ratings or rankings might be provided with different numbers of entries. For example, a player with a high rating might obtain 2 entries for every $0.01 in fractional value, whereas a player with a lower rating might only obtain 1 entry for every $0.01.

In some embodiments, different games might have entirely different paytable and awards. Further, in some embodiments, the number of entries which a player can obtain might be limited, such as to a certain number per ticket being redeemed or certain number of entries per day. For example, to avoid a player doing frequent cash-outs from machines and redeeming those tickets with low values (like lots of tickets with values like $2.36) and using the fractional currency to obtain many entries in valuable promotional events that may have large prizes, the player might be prevented from using the fractional value on more than a certain number of tickets or from obtaining more than a certain number of entries or the like, such as during a period of time (hour/day/week).

In one embodiment, more than one game may be available. The player may be presented with all available games and the option to elect to participate in more than one game. If a player elects to participate in more than one game, the player may be presented with an option to allocate the fractional value for purchase of entry to separate games (such as having different odds of winning, different prizes, etc.). For example, a player may elect to use a $0.78 portion of his ticket participate in a first promotional event for cash awards, and a second promotional event for a free meal voucher at a favorite restaurant.

In one embodiment involving multiple games, a player may be presented with games associated with special conditions. For example, a first promotional event may have already received more than 100 entries, while a second promotional event only received 5 entries. Thus, only the second promotional event may be displayed, or the second promotional event may be displayed at the top of a list of promotional events, while the first promotional event may be displayed at the bottom of the list.

In a step S14, it is determined whether the player has elected to purchase (e.g. use their fractional currency ticket value) one or more game entries. If not, then in a step S8, the voucher or ticket is preferably redeemed by dispensing its monetary value, as illustrated in FIG. 3 as well, and as described in more details above.

If in step S14 the player elects to purchase entries into the game, then the player may be prompted to insert a player loyalty card or otherwise provide any other type of information or identification associated with a player account in the casino system 20, the casino accounting system 26, and/or any other system used for accruing and tracking or awarding player awards over time. This identification may be necessary to obtain a player's contact information, such as to notify the player of winning awards associated with the purchased entry to the game and/or to associate entries with the player.

In a step S16, it is determined whether the player inserted a player loyalty card, or any other type of identification discussed above (or if provided, if the player has an account corresponding thereto). If not, then in a step S8, the voucher or ticket is preferably redeemed by dispensing its monetary value, as illustrated in FIG. 3 as well, and as described in more details above. An error message may be presented via a graphical user interface which is displayed via the display 30 of the kiosk 28, such as "A player loyalty card must be inserted to purchase entries to the Hot August Promotional Event for a chance for an award." A player may be returned to step 15 for a second prompt to insert a player loyalty card, or any other type of identification discussed above, or to step 8, where the voucher or ticket is preferably redeemed by dispensing its monetary value, as illustrated in FIG. 3 as well, and as described in more details above.

Validation may include determining whether the player loyalty card, or any other type of identification discussed above, is authentic (when the promotional event system 40 implements a player loyalty program with associated accounts, this may be done internally, and where such a system is separate, such as part of or connected to the casino system 20, by transmitting the information associated with the player loyalty card to that system to confirm the existence of a player account associated with the information). Validation may additionally include determining whether the player inserting the player loyalty card, or any other type of identification discussed above is the same individual identified on the inserted card or identification (such as via a PIN, password, two-factor authentication, biometric authentication, or any other type of method used to authenticate a person).

If, on the other hand, the player inserted a player loyalty card, or any other type of identification discussed above, then in a step S17, it is determined whether the player is validated. In one embodiment, the player may be presented with an option to identify a player account without having to insert a player loyalty card, or any other type of identification discussed above. For example, the player may provide personal information associated with the player account (such as one or more of the player's name, address, birthday, social security number, etc.). Additional player validation may be required, as discussed above.

If a player is not validated, an error message may be presented via a graphical user interface which is displayed via the display 30 of the kiosk 28, such as "A valid player loyalty card must be inserted to purchase entries to the Hot August Promotional Event for a chance for an award." A player may be returned to step 15 for a second prompt to insert another player loyalty card, or any other type of identification discussed above, or to step 8, where the voucher or ticket is preferably redeemed by dispensing its monetary value, as illustrated in FIG. 3 as well, and as described in more details above.

If, on the other hand, the player's account is validated, then in a step 18, request for one or more game entries may be transmitted to a promotional event system 40. The promotional event system 40 may transmit confirmation of creation of the requested number of entries back, as well as information associated with each entries (such as a unique identification number associated with each entry).

In a step 19, the purchase of entries and the information associated with each entry may be associated with the account identified with the player loyalty card, or any other type of identification discussed above ("player account").

In a step 11, the monetary value of the ticket or voucher, less the fractional value used to purchase entry tickets, is preferably paid to the player, as illustrated in FIG. 3 as well, and described above in more details.

In a step 20, a confirmation of the purchase of entries (such as a ticket, receipt, etc.) may be dispensed. The receipt may include terms and conditions, which may be in the form of text or a URL for electronic access.

At some point, the outcome of the game or event is determined, such as by the promotional event system 40. For example, the event might comprise a random draw of one or more entries into the event, or other types of games or events.

In one embodiment, the winner of a game may be notified based on the player account associated with the entry ticket. In one embodiment, the promotional event system 40 may identify a winning entry and notify the kiosk 28, the casino system 20, and/or the casino accounting system 26 of the identification. The player account associated with the winning entry ticket may be identified, and the player associated with the player account may be notified (such as via the contact information associated with the player account). In one embodiment, the player may redeem the prize at a designated location (such as at kiosk). In one embodiment, if a player associated with a first winning entry does not redeem the prize in a pre-determined time frame (such as 24 hours), the promotional event system 40 may eliminate the winning entry, and/or all other entry tickets associated with the same player account, and perform a second round of drawing using the remaining entries to identify a second winning entry.

In some embodiments, awards might be associated with the player's loyalty account (particularly where the awards comprise free game play or player loyalty points that might be redeemable for other prizes or awards). In environments in which a player value account, such as a player wallet exists, awards might be transferred directly to the player's wallet. For example, an award of $1000 for a winning promotional event entry might be deposited to the player's wallet (or other casino financial account), such as for later use or transfer to a bank account, etc.

Figure 4B:
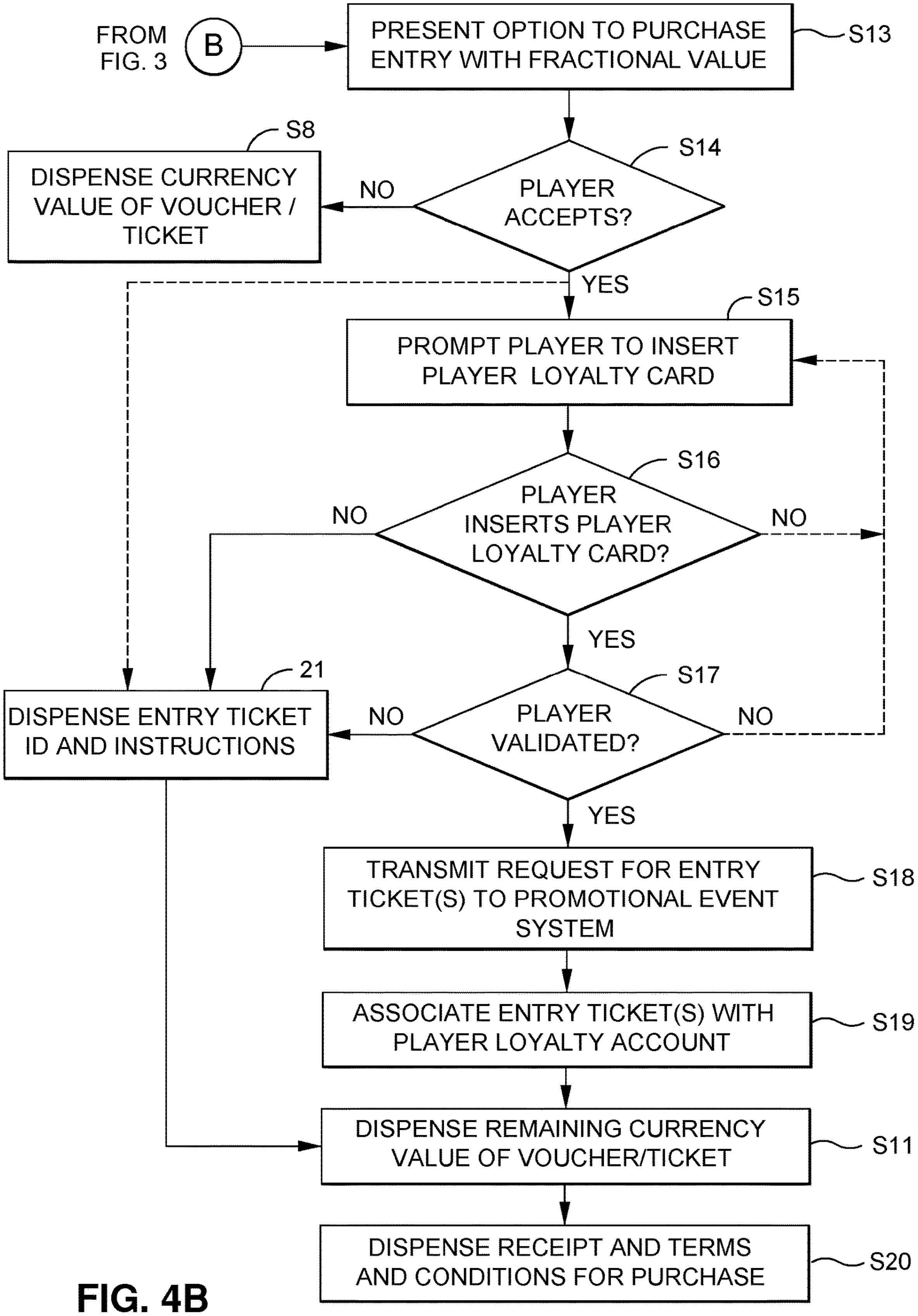
FIG. 4B illustrates a second exemplary flowchart of another embodiment of the invention.

FIG. 4B illustrates a second exemplary flowchart of another embodiment of the invention. In this embodiment, a player who does not have a player tracking or loyalty account may still be permitted to use the fractional value of a ticket to obtain or purchase entries into one or more games at cash-out of the monetary value ticket.

As illustrated in FIG. 4B, following step S16 illustrated in FIG. 4A and described above, if a player does not insert a player loyalty card or any other type of identification discussed above, then in a step 21 a form of identification of one or more entries may be dispensed ("proof of entry"), along with instructions to redeem the proof of entry. For example, if the player elected to use a fractional value of $0.18 to purchase 18 entries to a promotional event, a proof of entry representing the purchase of 18 entries to the promotional event may be dispensed. A preferred embodiment of the proof of entry may be a receipt or game ticket that includes a unique 2D barcode. The proof of entry may be used to redeem the entry(ies) at another location. In a preferred embodiment, the proof of entry may be redeemed at a kiosk.

When the player does not insert a player loyalty card or any other type of identification discussed above and following step 21, in a step 11, the monetary value of the ticket or voucher, less the fractional value used to purchase entries, is preferably paid to the player, as illustrated in FIG. 3 as well, and described above in more details. In a step 20, a confirmation of the purchase of entries (such as a receipt) may be dispensed. The receipt may include terms and conditions, which may be in the form of text or a URL for electronic access.

Where, on the other hand, a player does insert a player loyalty card or any other type of identification discussed above, steps S17 through S20 may follow, same as illustrated in FIG. 4A and described above in more details.

In such an embodiment the identification of a player account may not be required, and a player may be notified by other means to receive/redeem prizes from promotional events, step S21 may follow directly from step S14.

Figure 5:
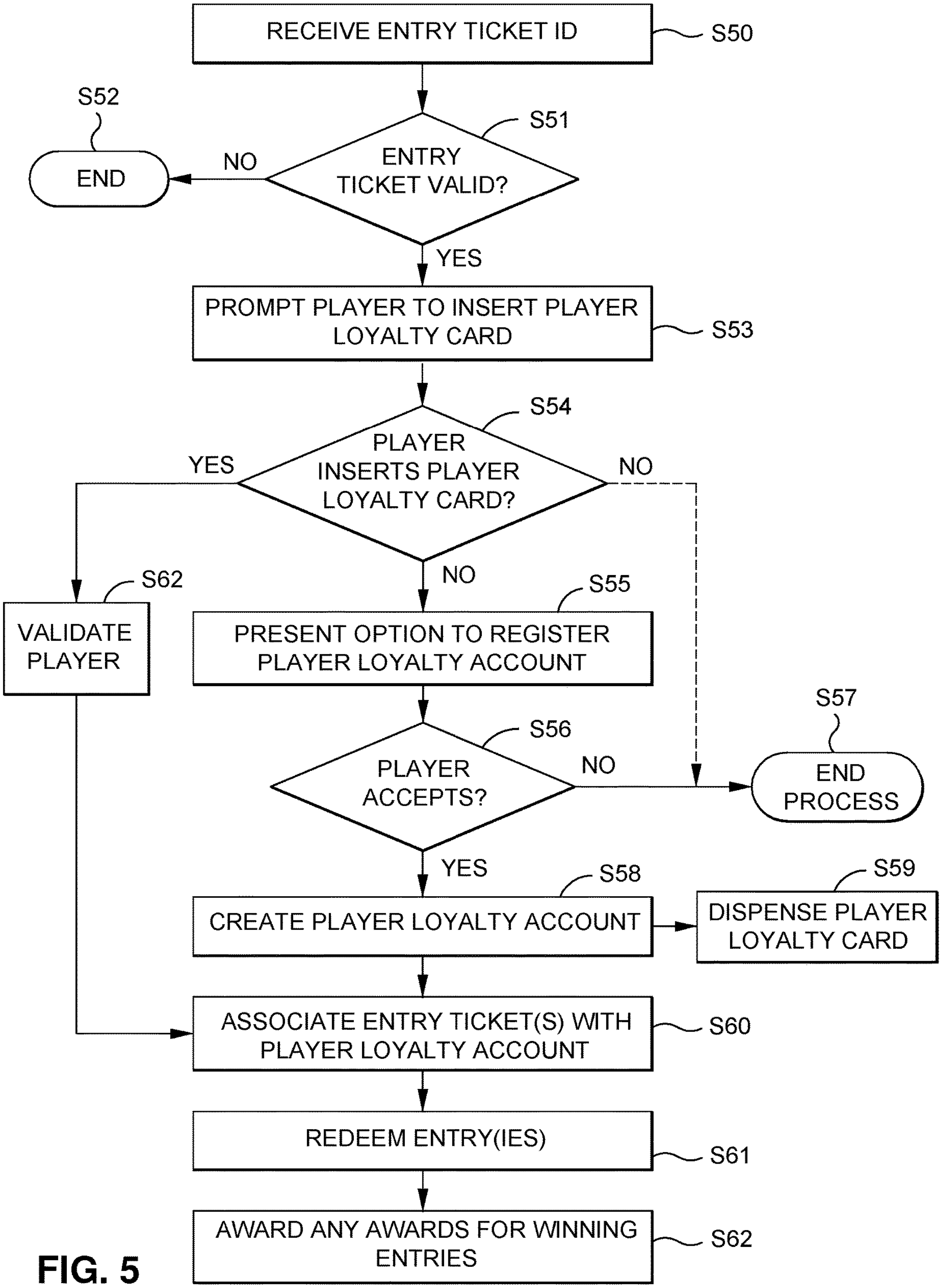
FIG. 5 illustrates an exemplary method of redemption when a player does not have a loyalty account.

FIG. 5 illustrates an exemplary method of redemption when a player does not have a loyalty account, such as following step S21 in FIG. 4. In one embodiment, the redemption process may occur at a kiosk. The kiosk might comprise the kiosk 28 described above, as configured to provide the functionality herein, or might comprise a separate kiosk, such as a loyalty or redemption kiosk (where, for example, such a kiosk may not be configured to redeem monetary value gaming tickets but might be particularly configured to redeem game entries, award promotional awards, etc.). However, the redemption process might occur in other locations, such as at a casino cage, loyalty program window, etc.

In FIG. 5, in a step S50, the proof of entry is presented and read at the kiosk, such as by scanning the unique 2D barcode on a proof of entry. In other embodiments, the proof of entry may be received by inserting a printed proof of entry into a reader of the kiosk, or when the proof of entry comprises other media such as a magnetic stripe card, by inserting such into a card reader or other device. In other embodiments, the proof of entry need not comprise physical media, but might comprise an image of a bar code, such as displayed by the player's phone and read by an optical reader. When the proof of entry is received at the kiosk, it is read, meaning that information regarding the purchase of entries to the game is obtained by the kiosk.

In a step S51, the proof of entry is validated. This may comprise confirming that the proof of entry can be redeemed. Confirmation may include one or more of the following: (1) communication with the kiosk 28 to determine whether the proof of entry is associated with a purchase, (2) communication with the kiosk 28 and/or a promotional event system 40 to determine whether the proof of entry is associated with the identified promotional event, (3) communication with the promotional event system 40 to determine whether entry to the promotional event is still open, and/or (4) any additional confirmation a casino system 20, a kiosk 28, and/or a promotional event system 40 may require.

If the proof of entry is not validated, the process may end, as in a step S52 (or the player might be given the opportunity to present other/additional proof of entries or the like).

If, on the other hand, the proof of entry is validated, then in a step 53, a player may be prompted to insert a player loyalty card or any other type of identification, same as step S15 illustrated in FIG. 4A and described above in more details. In a step 54, it is determined whether the player inserted a player loyalty card or any other type of identification, same as step S16 illustrated in FIG. 4A and described above in more details. If a player does not insert a player loyalty card or any other type of identification, in a step S55 the display device of the kiosk may present the player with an option to register a player loyalty account, or any other type player account associated with the casino system 20. In one embodiment, the player may also be notified a player account is required to redeem the proof of entry.

In a step 56, it is determined whether the player accepts the option to register a player account. If the player does not accept, then in a step S57, the process may end (the player may lose the opportunity to redeem their entry(ies). In some embodiments, the kiosk may return or dispense the fractional value back to the player for the unused entries.

If, on the other hand, the player accepts the option to register a player account, then in a step S58, a player account may be created. Specifically, the player may be presented with various options to enter personal information and perform the one or more necessary validation associated with player accounts and persons discussed above. Upon entry of necessary information and successful validation, the player account may be created. If a player account may not be created, then the process may again end at step S57 (and/or the unused fractional currency value may be dispensed).

In one embodiment, in a step S59, a player card associated with the player account may be dispensed (such as a player loyalty card associated with a player loyalty account).

Upon creation of a player account, in a step S60, entries may be associated with the player account in the same way as illustrated in S19 of FIG. 4A and discussed above. In a step S61, the entries may be redeemed, such as by checking to determine whether the entries were winning or losing as to the one or more relevant games or promotional events (such as via communication of the entries to the promotional event system 40). In a step s62, if one or more of the entries are winning, the award associated therewith may be dispensed (such as in the form of currency, a prize receipt that can be redeemed, etc.)

It will be appreciated that in the embodiment of the invention where the game or promotional event is implemented external to the kiosk 28 (or other monetary value ticket redemption location), the game or promotional event might be presented by a promotional event system 40 as described above. However, in other embodiments, the game or event might be implemented by a game server. Such a game server might be separate from the promotional event system 40 (or in lieu thereof), although in preferred embodiments, such a game server may still communicate with a player loyalty system, such as for implementing features noted above.

In one embodiment, the player is offered the opportunity to participate in the wagering game by wagering at least their fractional credit value. However, in other embodiments, the opportunity may be mandatory. In other words, if it is determined that the ticket has a fractional value, the player may automatically be informed that their fractional value will be played as a wager in a wagering event.

As noted above, in one embodiment the player might seek to redeem their monetary value ticket at an automated kiosk. However, the player might seek to redeem the ticket at a cashier station. As one example, the player might present a ticket to a cashier. The player might either insert their ticket into a reader or the cashier might do so or otherwise scan the ticket or input ticket data into a terminal. If the ticket has a fractional currency value, the player might be presented with the opportunity to play a wagering game as noted above. The player might elect to do so, such as by providing input to a device at the cashier station, such as by touching a button on a touch-screen display. The game might then be presented, such as via a central game module or a game module associated with the cashier station. The game would be displayed to the player in a similar manner as described above. If the player lost, the cashier could issue the player their remaining whole currency ticket value (the original amount less the fractional amount wagered), such as from a cash drawer. Likewise, if the player won, the cashier could issue the player a second whole currency value (the value of the ticket, less the fractional value wager amount, plus winnings) or the original amount less the fractional amount wagered plus a separate award, such as an award ticket or voucher or the like, as also described above.

The invention has numerous advantages. One particular advantage is a cashless gaming system which includes a mechanism for reducing or eliminating the fractional monetary values of tickets or vouchers which are being redeemed. In this regard, the invention may be said to facilitate "coinless" redemption of a ticket (in that the invention facilitates redemption of tickets in a manner which results in payment of only whole currency values and not fractional currency values, e.g. an amount of dollars and no cents, although it is possible to eliminate even payment for other fractional values such as dollar portions of five, ten or twenty dollars or the like). In one embodiment, this is accomplished by offering a wagering event to a player which results in the player wagering the fractional value of their ticket or voucher, thus resulting in the player being paid out a whole currency value (either the original monetary value of their ticket less the wagered fractional value or that amount plus an award). A particular benefit of the invention is the reduction or elimination of a large number of redemption transactions which would require the dispensing of coins. This greatly reduces the time and cost associated with filling the kiosk with coins of various denominations. The same principles can also apply to a cashier station, wherein when the invention is implemented only whole currency values are dispensed, thus reducing the need to stock change at the cashier station.

An additional benefit of the invention is that players are afforded the opportunity to play a game as part of the game ticket redemption, lending excitement to the process. The chance for winnings acts as enticement to players who might otherwise not redeem a ticket, thus leaving the ticket orphaned. For example, prior to the invention, a player might not bother redeeming a ticket having a value of $0.50. Now, however, the player is given the chance for winnings by redeeming the ticket, thus increasing the probability that the player will present the ticket for redemption.

Of course, invention may have a variety of configurations and features. The system 20 of the invention might be located a casino or in other locations or combinations of locations. For example, the system 20 might be implemented relative to a plurality of casinos, such as where gaming devices are located at each casino and are linked to a common accounting system. The kiosks 28 of the invention might be located at each casino. Of course, the system 20 of the invention might be implemented relative to other environments, such airports, bars, taverns or other locations. It will be appreciated that other redemption locations may be provided other than a kiosk. For example, a player might also present a ticket to a cashier or bartender having a portable redemption unit, which unit has similar capabilities (to accept/redeem a ticket, present the option for a fractional monetary value wagering event, etc.).

The system of the invention might include other devices or system and/or be linked to other systems and devices. For example, as noted above, the gaming devices, gaming tables or the like might be linked to or associated with a casino player tracking server or system, a bonusing or progressive system, a tournament system or the like.

In one embodiment, the kiosk might be operated by a kiosk operator, while the gaming event awards might be funded by the casino. In this configuration, the casino accounting system may be configured to track the wagers which are placed by players and also track amounts which are paid out via the kiosk(s). For example, the casino might form an award pool from wagers (such as starting with a seed value). The casino could set the odds of winning each event and the size of the awards so that winnings are paid from the pool of fractional monetary value wagers which are made (e.g. the redemption wagering event might be configured to be self-funding from the fractional value wagers).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of facilitating coinless redemption of a monetary value gaming system ticket comprising the steps of:

receiving, into a reader device at redemption kiosk, a physical monetary value ticket to be redeemed, the monetary-value ticket issued from a gaming machine and having associated monetary value;

validating said ticket as being redeemable;

determining a monetary value of the monetary value ticket;

when said monetary value comprises a monetary amount having a fractional currency value, presenting an option to enter a gaming event based upon said fractional currency value;

accepting input from a user of the kiosk to enter said gaming event via an input device of said kiosk;

redeeming said ticket for a first whole currency value comprising said monetary value less said fractional currency value by dispensing from said kiosk currency in the amount of said first whole currency value;

converting said factional currency value to one or more plays of said gaming event;

transmitting information regarding the one or more plays of said gaming event to a game event server which determines an outcome of each of said plays and winnings for any winning outcomes; and when said one or more of said plays of said gaming event are winning, awarding said winnings to said user.

2. The method of claim 1 further comprising the steps of accepting input from said user of identification associated with a loyalty account.

3. The method of claim 2 wherein said gaming event comprises an entry selection event and further comprising the steps of converting said factional currency value to one or more unique entries for said entry selection event based on information associated with said loyalty account.

4. The method of claim 3 wherein information regarding said unique entries is stored in association with said loyalty account.

5. The method of claim 2 wherein said winnings are associated with said loyalty account.

6. The method of claim 1 wherein said gaming event comprises an entry selection event and said one or more plays comprise entries into said entry selection event.

7. The method of claim 6 wherein said entry selection event comprises a lottery type event.

8. The method of claim 1 wherein said gaming event comprises a slot type game and said one or more plays comprise spins of said slot type game.

9. The method of claim 1 wherein information regarding a presentation of each of said one or more plays of said gaming event is presented to said user via a display of said kiosk.

10. The method of claim 1 wherein said winnings comprise one or more of the following: cash award, goods, services, free wagering game play, and entry into another gaming event comprising prizes of higher values.

11. A cashless gaming system configured to facilitate coinless monetary value ticket redemption comprising:

at least one gaming device which presents one or more wagering games and dispenses physical monetary value tickets;

at least one casino accounting server which is in communication with said at least one gaming device at one or more times, said at least one casino accounting server configured to store information regarding said monetary value ticket, including a ticket identifier and a monetary value of said ticket; and at least one redemption kiosk having at least one ticket reader, at least one display device, at least one user input device, at least one currency dispensing device, at least one processor, at least one memory, and machine readable code stored in said memory and executable by said processor to:

transmit information regarding a ticket presented to said at least one ticket reader to said at least one casino accounting server for validation;

when said ticket is validated by said at least one casino accounting server and a monetary value of said ticket has a fractional monetary value of currency, present an option to purchase one or more plays of a gaming event based upon said fractional currency value;

accept input from a user of the kiosk to purchase said one or more plays via an input device of said kiosk via said at least one user input device;

redeem said ticket for a first whole currency value comprising said monetary value less said fractional currency value by dispensing from said kiosk currency in the amount of said first whole currency value;

convert said factional currency value to said one or more plays;

transmit information regarding the one or more plays of said gaming event to a gaming event server which determines an outcome of each of said plays and winnings for any winning outcomes; and award winnings for any winning outcomes of said plays to said user.

12. The cashless gaming system of claim 11 further comprising a player tracking system, and wherein said processor is further configured to cause said kiosk to accept input from said user of identification associated with a player tracking account in said player tracking system.

13. The cashless gaming system of claim 12 wherein the gaming event comprises an entry selection event and the plays comprise entries into said entry selection event.

14. The cashless gaming system of claim 12 wherein the gaming event comprises an entry selection event and the plays are represented as entries into the entry selection event and information regarding said entries is stored in association with said player tracking account.

15. The cashless gaming system of claim 12 comprising associating said winnings with said player tracking account.

16. The cashless gaming system of claim 12 wherein said gaming event comprises a slot type game and each play of said gaming event comprises a spin of said slot type game.

17. The cashless gaming system of claim 16 wherein a visual representation of each spin is presented to said user via a display of said kiosk.

18. The cashless gaming system of claim 11 wherein said winnings comprise one or more of the following: cash award, goods, services, free wagering game play, and entry into another gaming event comprising prizes of higher values.

* * * * *